United States Patent [19]
Lohberg

[11] Patent Number: 5,998,989
[45] Date of Patent: Dec. 7, 1999

[54] DEVICE INCLUDING MAGNET-BIASED MAGNETORESISTIVE SENSOR AND ROTATABLE, MAGNETIZED ENCODER FOR DETECTING ROTARY MOVEMENTS

[75] Inventor: Peter Lohberg, Friedrichsdorf, Germany

[73] Assignee: ITT Automotive Europe GmbH, Frankfurt, Germany

[21] Appl. No.: 08/666,378

[22] PCT Filed: Dec. 20, 1994

[86] PCT No.: PCT/EP94/04242

§ 371 Date: Aug. 26, 1996

§ 102(e) Date: Aug. 26, 1996

[87] PCT Pub. No.: WO95/17680

PCT Pub. Date: Jun. 29, 1995

[30] Foreign Application Priority Data

Dec. 22, 1993 [DE] Germany .............................. 43 438 28

[51] Int. Cl.⁶ .................................................. G01P 3/487
[52] U.S. Cl. ..................................... 324/174; 324/207.21
[58] Field of Search .................................. 324/173, 174, 324/207.2, 207.21, 207.22, 207.25, 252; 384/448; 341/15; 303/138

[56] References Cited

U.S. PATENT DOCUMENTS

| | | | |
|---|---|---|---|
| 4,319,188 | 3/1982 | Ito et al. .................................... | 324/173 |
| 4,361,805 | 11/1982 | Narimatsu et al. ................. | 324/207.21 |
| 4,646,088 | 2/1987 | Inoue .............................. | 324/207.22 X |
| 4,865,468 | 9/1989 | Kato et al. .............................. | 384/448 |

FOREIGN PATENT DOCUMENTS

| | | | |
|---|---|---|---|
| 0213732 | 3/1987 | European Pat. Off. ................ | 324/174 |
| 58-106462 | 6/1983 | Japan . | |
| 129106 | 9/1983 | Japan ................................ | 324/207.21 |
| 189501 | 11/1983 | Japan ................................ | 324/207.21 |
| 59-19810 | 2/1984 | Japan . | |
| 157514 | 9/1984 | Japan ................................ | 324/207.21 |
| 60-61661 | 4/1985 | Japan . | |
| 2071333 | 9/1981 | United Kingdom . | |

OTHER PUBLICATIONS

Derwent's Abstract, Nr92–322587/39, Woche 923, Abstract of SU, 1689859 (As Belo Solid Body Phys Inst Viteb), Nov. 7, 1991.

*Primary Examiner*—Gerard Strecker
*Attorney, Agent, or Firm*—Rader, Fishman & Grauer PLLC

[57] ABSTRACT

A device for detecting rotary movements includes a measuring data emitter that co-rotates with the part performing the rotary movement, and a stationary transducer which includes a magneto-resistive sensor element with a bias magnet. The measuring data emitter is an encoder having successive permanent magnet areas of alternating polarity in the direction of rotation (Y direction). The sensor element is arranged and the bias magnet is magnetized in such a way that, during rotary movement, in a preferred direction of the sensor element (Y direction) which is orthogonal to the magnetic field component (X direction) produced by the bias magnet, the magnetized areas cause a variable magnetic field component between the adjacent permanent magnet areas which is representative of the rotary movement and passes through the magneto-resistive sensor element in the Y direction.

10 Claims, 6 Drawing Sheets

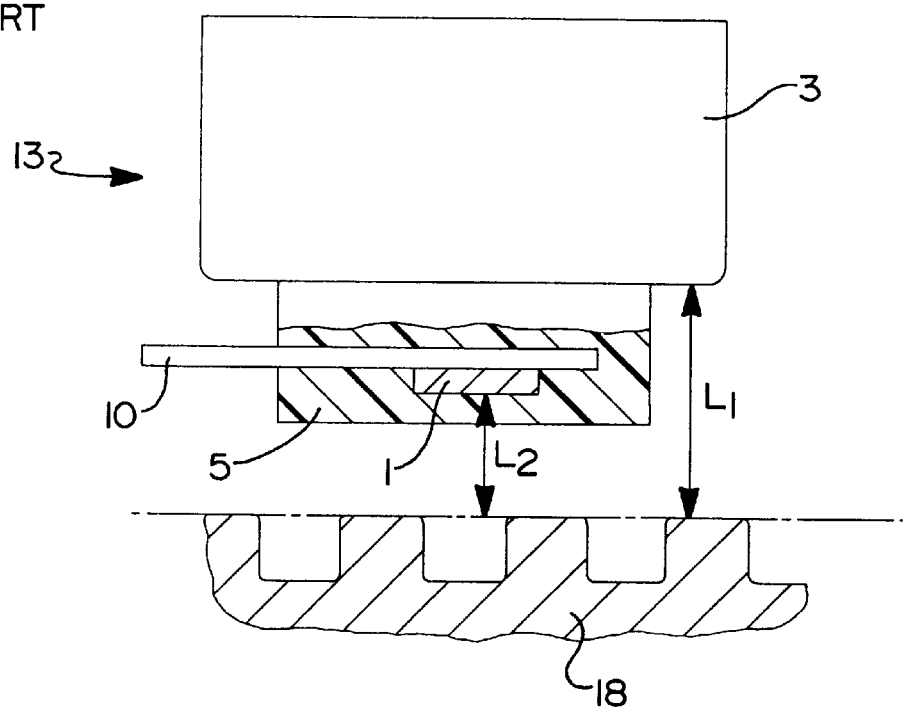
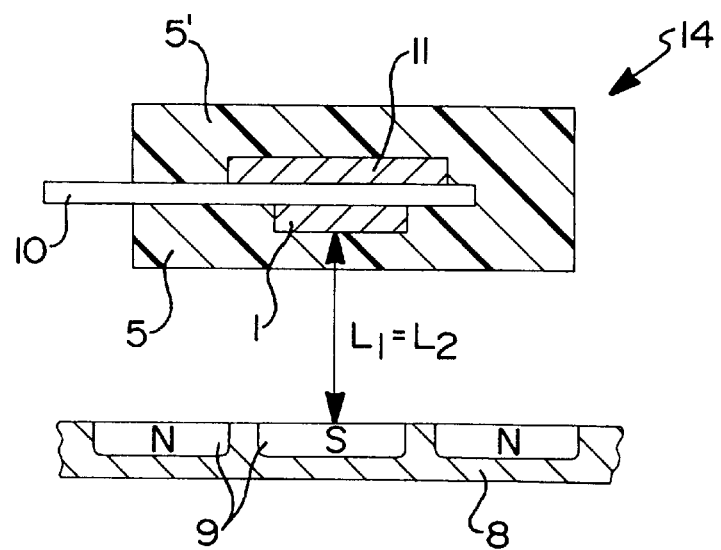

DEVICE INCLUDING MAGNET-BIASED MAGNETORESISTIVE SENSOR AND ROTATABLE, MAGNETIZED ENCODER FOR DETECTING ROTARY MOVEMENTS

TECHNICAL FIELD

The present invention relates to a device for detecting rotary or angular movements.

BACKGROUND OF THE INVENTION

Devices of this type are often required on automobiles to monitor the rotational behavior of the individual vehicle wheels. Wheel speed is of critical importance as an input variable for control systems, such as anti-lock systems, traction slip control systems and driving stability control systems.

Sensor devices to determine the rotational speed of wheels are known in a great number of applications. Normally, the measuring data emitter in such sensor devices is an incremental encoder which is coupled mechanically to the component or wheel the rotation of which is to be measured. Further, there is a transducer or sensor which scans the encoder. Ferromagnetic toothed wheels, toothed rings, ferromagnetic hole discs, etc., are used as encoders. When sensors are used in wheel bearings, it is also customary to employ magnetized structures as a measuring data emitter, for example, annular or circular arrangements of successive north/south poles, embedded in a mechanic carrier member.

It is also common to use so-called "passive" sensors according to the reluctance principle. These sensors use a copper coil with a permanent magnet as a transducer. The transducer is coupled magnetically to the toothed disc serving as measuring data emitter, or to any other encoder. The encoder modulates the magnetic coupling reluctance synchronously with movement, and an alternating voltage representative of the movement is induced in the copper coil. The frequency of the alternating voltage permits being evaluated as a measured quantity to determine the rotational wheel speed. The magnitude of the induced signal voltage is a function of the rotational speed and the air slot between the measuring data emitter and the transducer or between the tooth system and the sensor.

"Active" sensors, which also cover the subject matter of the present invention, are well known in the art. In principle, they are combined of a magneto-statically sensitive element and a permanent magnet which is magnetically coupled to the encoder. The encoder modulates, synchronously to movement, the magnetic coupling reluctance or the field direction, and the sensor element responds to the variation of the flux density or the movement of a field vector. Examples in the art of such magneto-statically responsive elements are Hall probes and magneto-resistive structures on the basis of permalloys. The magnitude of the signal voltage on the sensor element is responsive to the air slot, but independent of the rotational speed or the frequency.

The publication entitled "Magneto-resistive rotational speed sensor—reliable and inexpensive" (Graeger, Petersen, Elektronik 24/1992, pages 48 to 52) describes an active rotational speed sensor of such a type which interacts with a toothed disc made of ferromagnetic material that is the measuring data emitter. The actual sensor element includes a permanent magnet on the side remote from the toothed disc. The magnetic field of this magnet serves to bias the magneto-resistive sensor element and to produce the magnetic coupling reluctance with the co-rotating toothed wheel. Therefore, a permanent magnet with a relatively large volume is required to permit an air slot that is sufficient in practical operations.

An object of the present invention is to provide a device of the previously mentioned type including an active sensor element which, compared to known devices of this type, necessitates a minimum possible structural volume to permit accommodation of the device in a wheel bearing of an automotive vehicle, for example, and which also permits a largest possible air slot or distance between the measuring data emitter and the transducer.

A special feature of the device of the present invention is that the measuring data emitter has successive permanent magnet areas of alternating polarity in the direction of rotation, and that the sensor element is arranged and the bias magnet is magnetized such that the bias magnet produces a field component which extends vertical to the direction of movement of the measuring data emitter in a preferred direction of the sensor element, and that during a rotary movement, in a preferred direction of the sensor element which is orthogonal to the magnetic field component produced by the bias magnet, the magnet areas cause a varying course of field strength between the adjacent permanent magnet areas which passes through the sensor element in the direction of rotation and represents the rotary movement.

A magneto-resistive sensor element is used in the present invention because it is known to permit, under comparable conditions, larger air slots between the encoder and the sensor compared to Hall elements. The sensor element KMI 10/1 cited in the above-mentioned publication (Elektronik 24/1992) is an example of a like active rotational speed sensor element. The above-mentioned sensor element is intended for use in combination with an encoder of any ferromagnetic material. As is shown in the attached FIG. 1, the sensor comprises a magneto-resistive resistance bridge 1, an electronic evaluating circuit 2 and a permanent magnet 3 which is magnetized in the direction of the XZ plane. In operation, the sensor is coupled magnetically over a small air slot to a toothed wheel made of ferromagnetic material. The teeth are oriented in the X direction (see FIG. 1) and move on rotation of the toothed wheel in the Y direction past the side of the bridge, comprising the magneto-resistive resistors, that is opposite to the permanent magnet 3. The result is an alternating deformation of the magnetic field of the XZ plane additionally in the Y direction. The magneto-resistive bridge is so designed and arranged that it reacts to the field strength component in the Y direction by mistuning. The electronic evaluating circuit 2 mainly comprises a bridge signal amplifier with a subsequent trigger circuit which produces a binary output signal with two constant amplitude values in the area of the nominal air slot irrespective of the size of the air slot. The change in flanks of the amplitude values represents the division of the toothed wheel of the measuring data emitter. The evaluating circuit is designed so as to issue the signal in the form of a current through terminals 4. Both the sensor element and the signal-processing circuit are integrated circuits that are encapsulated in a plastic housing each. The two housings are mechanically interconnected by a system carrier member 10. Also, the system carrier member provides the electrically conductive connections.

The device of the present invention is based on the teaching that the desired reduced structural, volume and, additionally, a larger admissible air slot can be achieved by subdividing the magnetic structure into a bias magnet, which produces a magnetic field in the X direction, that is, in one of the preferred magnetic directions of the magneto-resistive sensor element, which extends orthogonally to the direction of movement of the encoder (Y direction), and the permanent magnet areas of a measuring data emitter.

In a preferred embodiment of the device of the present invention, the measuring data emitter has the shape of a disc performing the rotary movement. More preferably, the disc-shaped emitter is cylindrical in shape having an inner and outer periphery. The permanent magnet areas are distributed evenly over the periphery of the disc. Preferably, the permanent magnet areas are embedded on the outer edge periphery of the disc. Alternatively, the permanent magnet areas are embedded on the inner periphery of the disc. Appropriately, the permanent magnet areas are embedded in a mechanic carrier material or they are produced by magnetization of areas. The transducer is aligned in parallel to the disc or paraxially depending on the arrangement of the areas.

Further favorable embodiments of the present invention are set forth herein. For example, the transducer may be configured as a one-housing or a two-housing basic element, and the bias magnet may be arranged on the housing, especially on the side remote from the encoder, or it may be embedded into the housing.

BRIEF DESCRIPTION OF THE DRAWINGS

FIG. 6(a) and FIG. 6(b) are schematic, partial cross-sectional views of the arrangement of a transducer relative to a measuring data emitter in a prior art measuring device (FIG. 6(a)) and a measuring device according to the present invention (FIG. 6(b)).

DETAILED DESCRIPTION OF THE PREFERRED EMBODIMENTS

Figure 1:
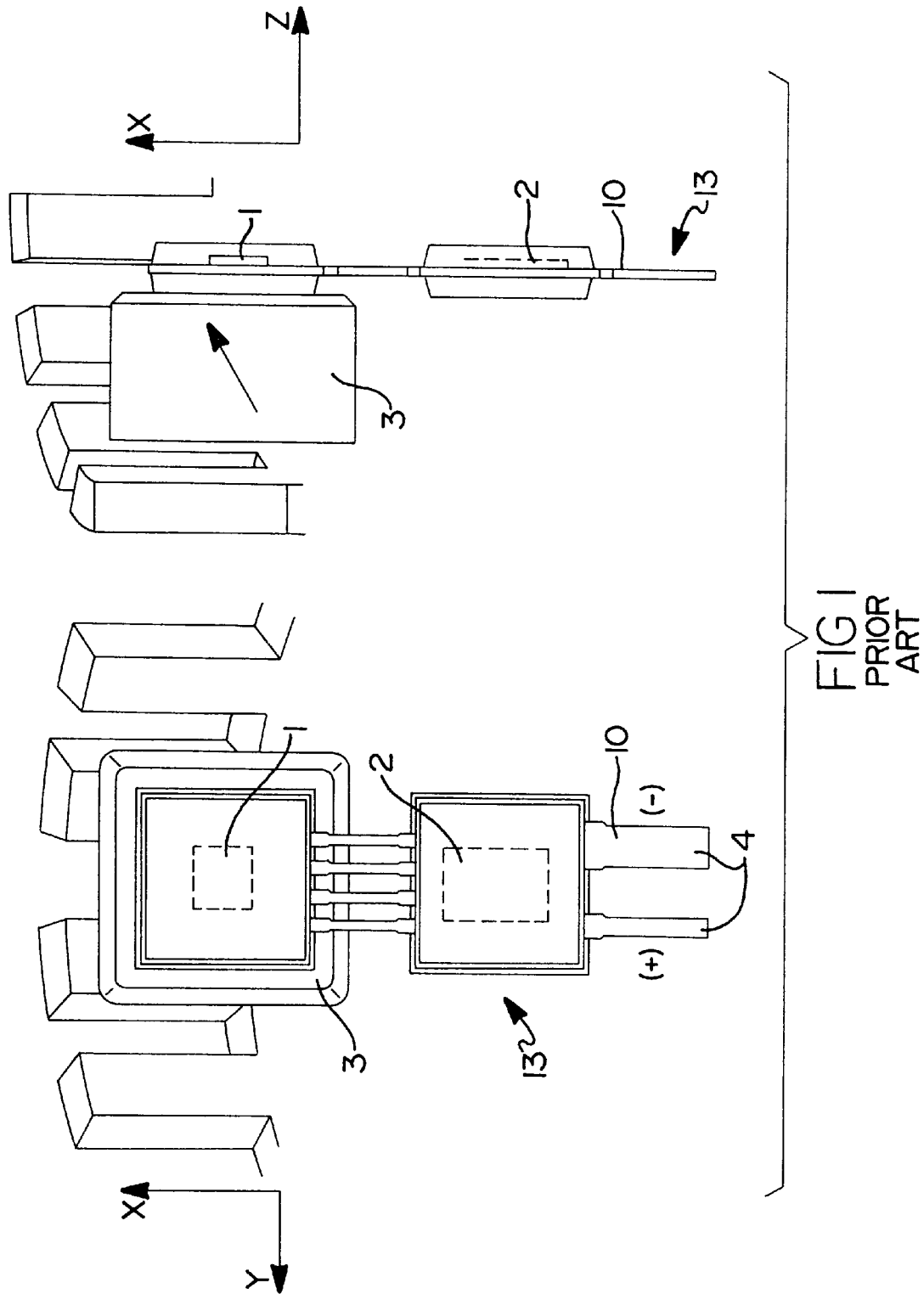
FIG. 1 is a top view and a side view of the basic design of the previously described prior art transducer including an active sensor element.
Figure 2:
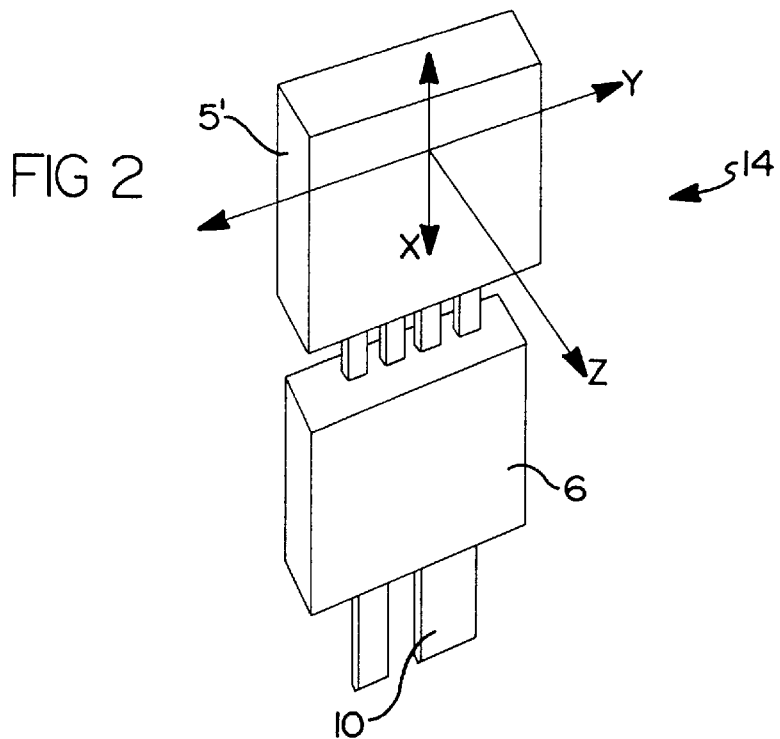
FIG. 2 is a perspective, schematically simplified view of the outside design of an embodiment of a transducer of the device of the present invention.

In contrast to FIG. 1, FIG. 2 shows a transducer 14 for a device of the type of the present invention. The embodiment of FIG. 2 relates to a two-housing transducer accommodating in a sensor housing 5' a magneto-resistive sensor element and a bias magnet which has a very small size compared to the state of the art, and in an IC housing 6 an evaluating circuit which is preferably provided by an integrated circuit. The entire assembly unit is preferably mounted on a common system carrier member 10, similar to the system carrier member of FIG. 1. The reference directions X, Y, Z which are used to explain the present invention more closely are identified in FIG. 2. 'Y' refers to the direction of movement or the direction of rotation of the associated encoder (see FIG. 3), 'X' refers to the preferred magnetic direction of the sensor element 1 which is orthogonal to 'Y' and defines the polarizing direction of the bias magnet (7, 11; see FIGS. 3 to 5). Finally, 'Z' refers to the third reference direction of the coordinate system used in this respect.

Figure 3:
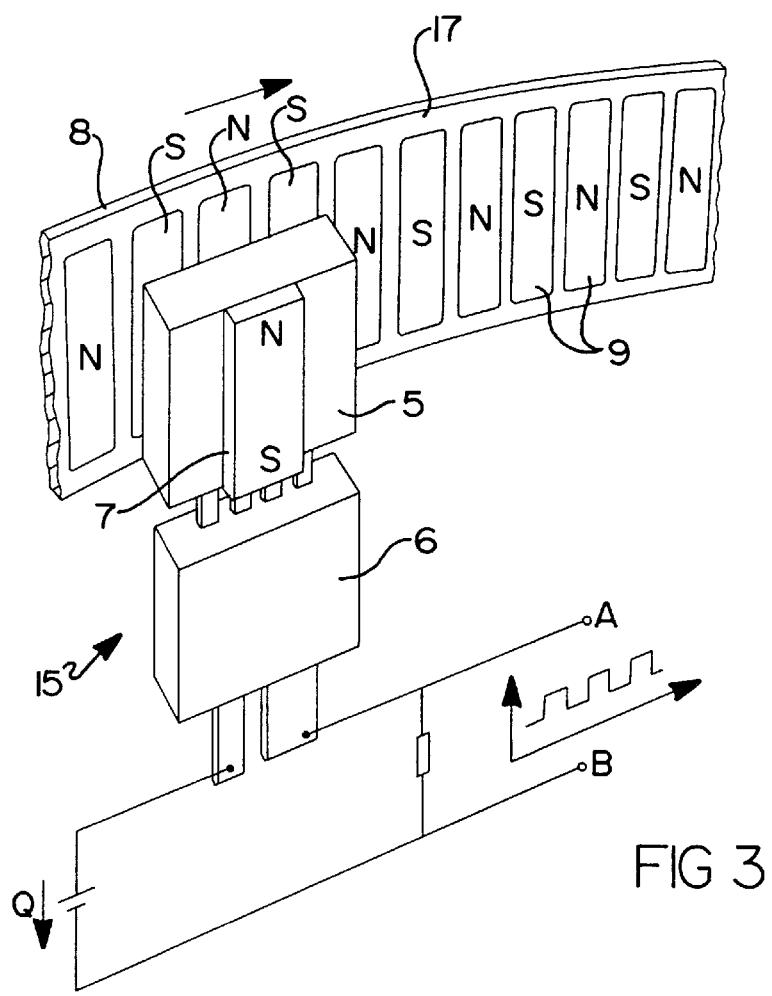
FIG. 3 is a view, similar to FIG. 2, of a second embodiment of the device of the present invention in combination with an encoder.

FIG. 3 illustrates the relative arrangement of the transducer 15 and the associated measuring data emitter 8 of the present invention. In contrast to the embodiment of FIG. 2, the bias magnet 7 in FIG. 3, which is polarized in the X direction, is arranged outside the sensor housing 5. Sensor housing 5 accommodates the sensor element 1 (not shown).

As is shown in FIG. 3, a magnetic encoder 8 is used as a measuring data emitter in the present invention. Encoder 8 is a disc having a plurality of permanent magnet areas 9 spaced evenly and distributed evenly on the inner periphery of the disc on the rotational surface. The areas 9, which are magnetized or embedded in a carrier material 17, form alternating successive north and south poles N/S in the direction of movement or Y direction. When the device of the present invention is configured as a bearing sensor, suitably, the encoder is a wheel bearing sealing ring magnetized as shown in FIG. 3.

When the magnetic encoder 8 of the embodiment of FIG. 3 is moved in the Y direction, an electric signal voltage develops at terminals A/B whose frequency is determined by the sequence of the north pole south pole alternation. Because the sensor in this arrangement is an active sensor, an electric energy source is required, which is identified by the source Q.

Figure 4:
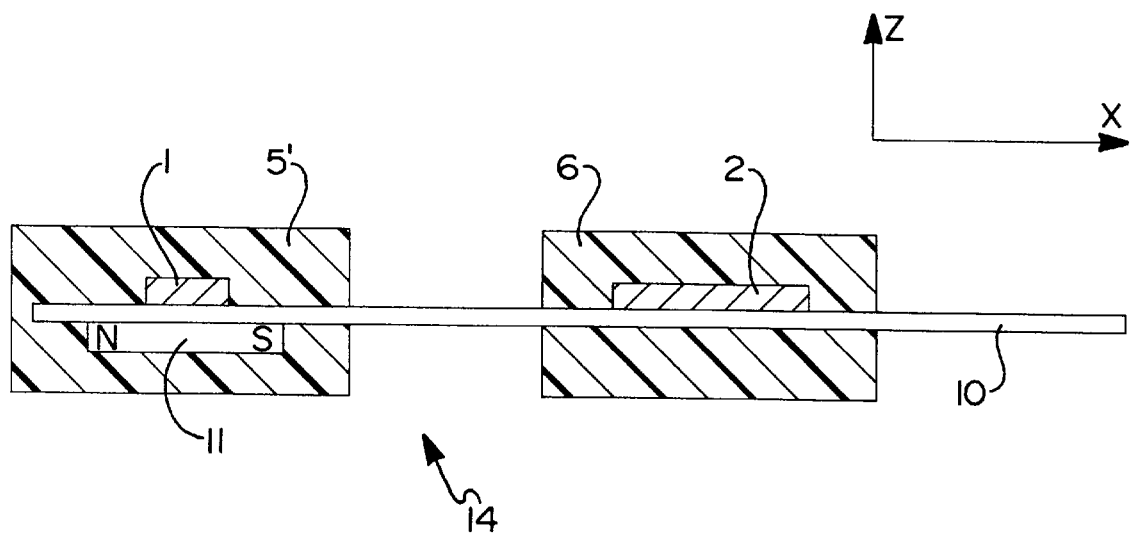
FIG. 4 is a cross-sectional schematic view of the basic design of an embodiment of the transducer of FIG. 2.

FIG. 4 is a schematic view of the internal construction of the transducer, which is shown in a perspective view in FIG. 2. A two-housing basic element is seated on the carrier structure member 10. The housing part 5' accommodates the magneto-resistive element 1 and the bias magnet 11. The bias magnet 11 is magnetized in the X direction and is arranged on the side remote from the magnetized encoder 8 (see FIG. 3). Thus, the sensor element 1 is arranged between the bias magnet 11 and the magnet areas 9 of the encoder or measuring data emitter 8. The evaluating circuit 2 is accommodated in the second housing part 6.

Figure 5:
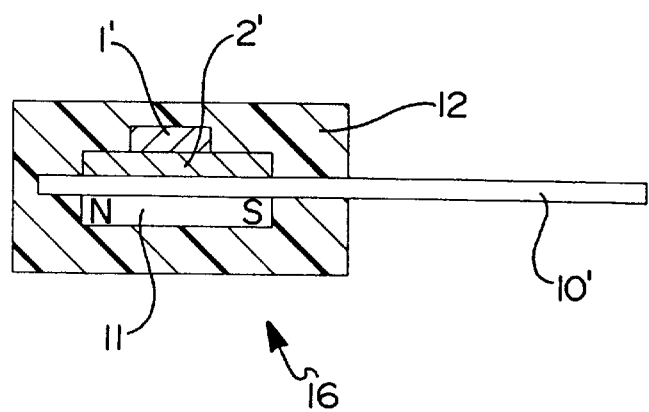
FIG. 5 is a view, similar to FIG. 4, of an alternative embodiment of the transducer of the present invention.

The transducer of FIG. 5 differs from the embodiment of FIG. 4 by the positioning of the evaluating circuit 2'. The electronic circuit 2 in this embodiment is incorporated between the sensor element 1' and the bias magnet 11. The carrier structure member 10', in which the electrical connections are included, is interposed between the circuit 2' and the bias magnet 11. Other arrangements are also possible. Above all, it is important that the permanent magnetic field of the bias magnet 11 extends through the sensor element 1' in the X direction and that the sensor element 1' is exposed to the magnetic field of the magnet areas 9 of the encoder 8 in the Y direction (not shown).

The outside configuration of the bias magnet 11 is not limited to a defined shape. What matters is the premagnetization in the X direction. The type of shape may then be chosen by taking into consideration the method of manufacture or the installation of the transducer. A small volume is sufficient for the bias magnet 11 because its field is only required to pass through the sensor element 1, 1', but does not have to bridge the air slot to the measuring data emitter 8.

A major advantage of the measuring device of the present invention compared to prior art devices having an active sensor element and a ferromagnetic measuring data emitter is the reduced structural volume necessary. Only this reduction in volume permits the design of a wheel bearing sensor according to this principle in practical operations.

FIG. 6 shows the differences between the state of the art and the present invention. In the known principle in FIG. 6a, a large-volume permanent magnet 3 is required whose magnetic field in the Z direction must reach beyond an air slot $L_1$, up to the ferromagnetic measuring data emitter 18. In FIG. 6b, showing the arrangement of the present invention, a bias magnet 11 of a much smaller size is sufficient. It has shown in practical operations that a permanent magnet diminished in size by the factor 100 is sufficient for the device of the present invention.

The admissible air slot between the sensor element 1 and the surface of the magnetized encoder 8 may become considerably larger in the device of the present invention than that of the prior art rotational speed measuring device of FIG. 6a.

Thus, the permanent magnet 3 of the prior art device has to produce a magnetic field over the distance $L_1$, with only the distance $L_2$ being available as an air slot (when neglecting the housing in which the sensor element 1 is accommodated). In contrast thereto, $L_1 = L_2$ applies in the device of the present invention.

Figure 7:
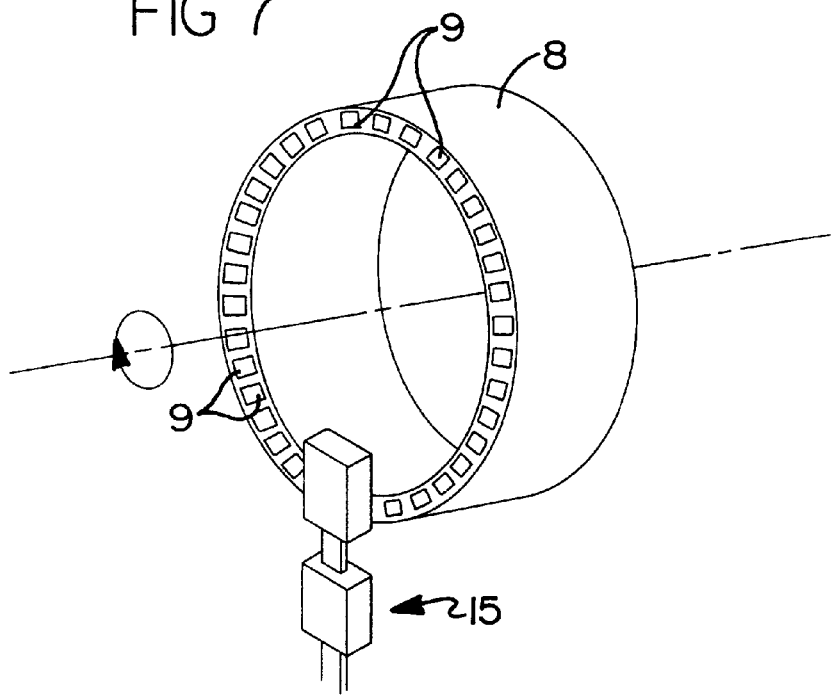
FIGS. 7 and 8 are perspective views of various arrangements of the data emitter and the transducer.
Figure 8:
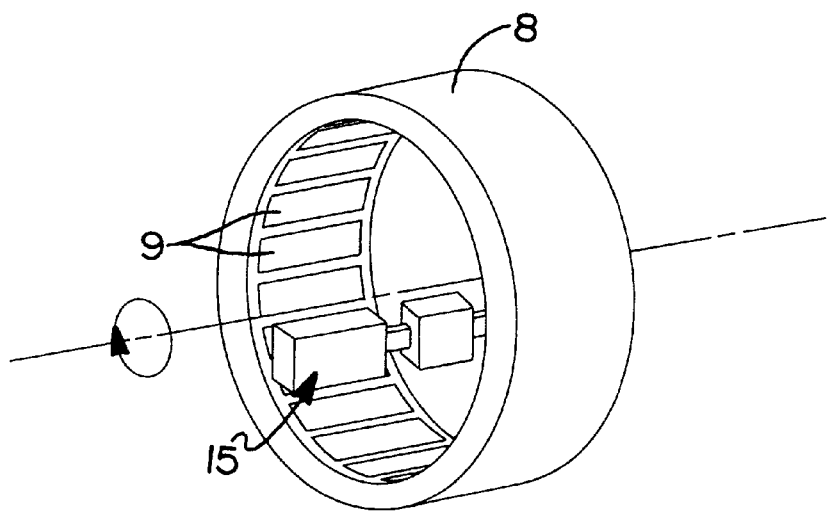

FIGS. 7 and 8 show various arrangements of the permanent magnet areas 9 on the encoder 8 with respect to the transducer 15 of the present invention. In one embodiment as shown in FIG. 7, the permanent magnet areas 9 are arranged on the outer edge periphery of the encoder 8. In this configuration, transducer 15 is arranged parallel to the rotational plane of encoder 8 and perpendicular to the rotational axis.

In an alternative embodiment as shown in FIG. 8, the permanent magnet areas 9 are arranged on the inner periphery of encoder 8. In this configuration, transducer 15 is arranged paraxially to the rotational axis of the encoder 8.

Figure 9:
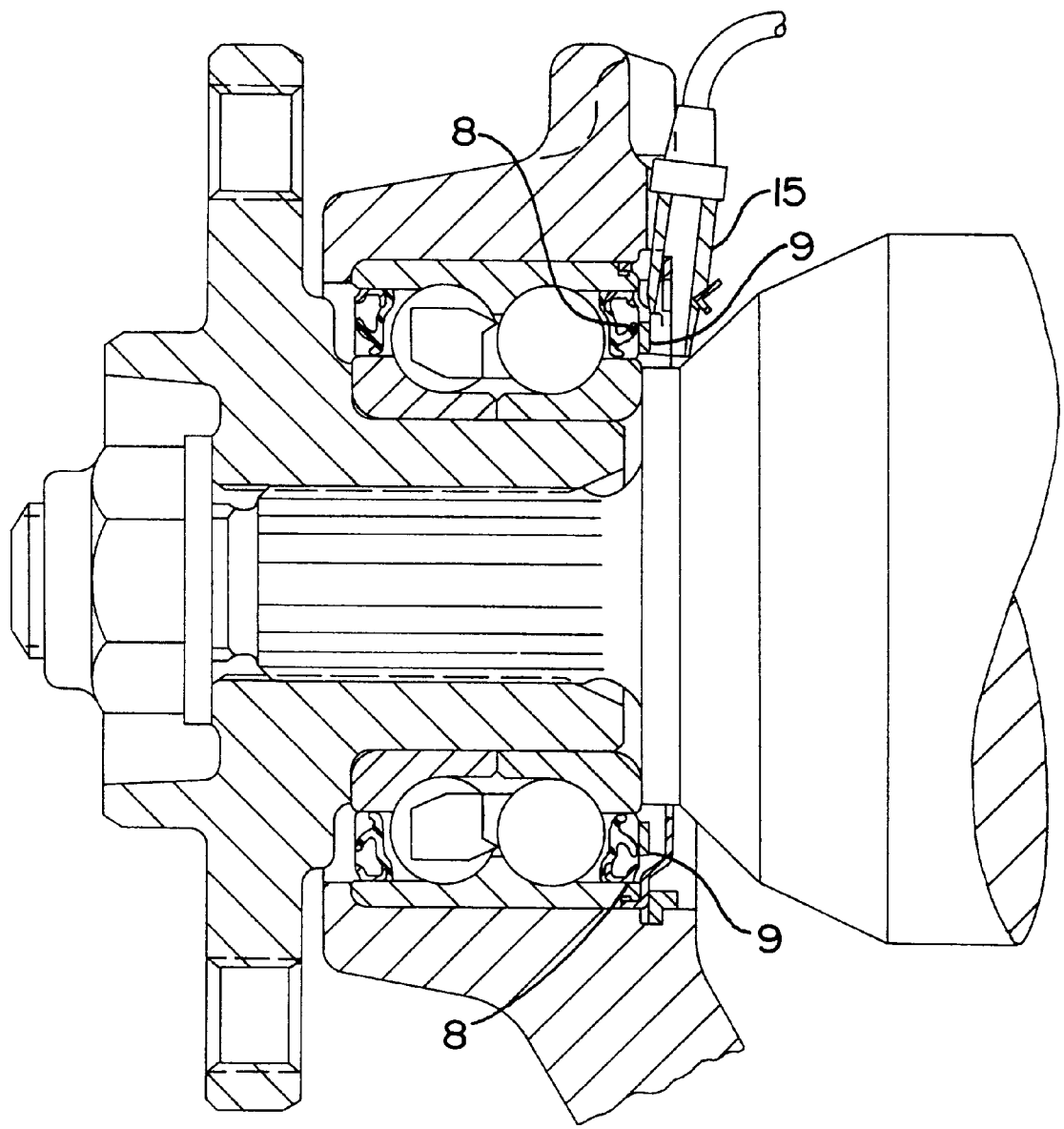
FIG. 9 is a cross-sectional view of the data emitter and transducer of the present invention assembled in a wheel bearing.

FIG. 9 shows an example of the data emitter/transducer assembly installed in a wheel bearing according to the present invention. As shown in FIG. 9, data emitter 8 of the present invention is installed into the wheel bearing. The transducer 15 is then installed in close proximity to magnet areas 9 of the data emitter 8 such that the magnetic flux is detected when the wheel rotates.

The arrangements as shown in FIGS. 7, 8, and 9 are for illustrative purposes only and other arrangements of the encoder 8 and transducer 15 in a wheel bearing may be employed without departing from the scope of the present invention. Accordingly, the preceding description is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

I claim:

1. A device for detecting rotary movements, comprising:

a disc-shaped data emitter mounted in a wheel bearing including successive permanent magnet areas distributed evenly over a periphery of the disc having polarities alternating in the direction of said rotary movement and oriented in a direction perpendicular to the direction of said rotary movement, and a stationary transducer having a first side facing said data emitter and a second side facing perpendicularly away from said data emitter and spaced from said data emitter, said stationary transducer including a magneto-resistive sensing element and a bias magnet for providing a bias magnetic field to the sensing element, wherein said bias magnet is polarized in a direction perpendicular to the direction of said rotary movement and to the direction of orientation of the polarities of the permanent magnet areas, wherein said bias magnet is mounted on said second side of said stationary transducer to minimize the thickness of said stationary transducer.

2. Device as claimed in claim 1, wherein the permanent magnet areas are arranged in the rotational plane perpendicular to the rotational axis of the disc on an outer edge periphery of said disc, and the stationary transducer is aligned in parallel to the rotational plane of the disc.

3. Device as claimed in claim 1, wherein said disc is cylindrical in shape having an inner and outer periphery, the permanent magnet areas are arranged over the inner periphery of the disc, and the transducer is aligned paraxially with the disc.

4. Device as claimed in claim 1, wherein the permanent magnet areas are provided by embedding magnetic members in a mechanic carrier material or by magnetizing areas of a carrier.

5. Device as claimed in claim 1, wherein the transducer is comprised of a two-housing basic element attached to a mounting carrier, and wherein the bias magnet is arranged outside the housing of the magneto-resistive sensor element.

6. Device as claimed in claim 5, wherein the transducer is configured as a one-housing basic element, and in that the bias magnet is arranged outside the housing on the side of the housing remote from the measuring data emitter.

7. Device as claimed in claim 5, wherein the transducer is configured as a two-housing basic element, and in that the bias magnet is arranged inside the housing of the magneto-resistive sensor element.

8. Device as claimed in claim 5, wherein the transducer is configured as a one-housing basic element, and in that the bias magnet is arranged inside the basic element.

9. Device as claimed in claim 5, wherein the bias magnet is arranged inside or outside the housing relative to the magneto-resistive sensor element on the side remote from the measuring data emitter.

10. Device as claimed in 1, wherein said data emitter is provided by incorporating permanent magnet areas in a wheel bearing sealing ring or by magnetization of corresponding areas.

* * * * *